United States Patent
Chen et al.

(10) Patent No.: US 9,830,043 B2
(45) Date of Patent: Nov. 28, 2017

(54) PROCESSING METHOD AND PROCESSING DEVICE FOR DISPLAYING ICON AND ELECTRONIC DEVICE

(71) Applicants: Beijing Lenovo Software Ltd., Beijing (CN); Lenovo (Beijing) Co., Ltd., Beijing (CN)

(72) Inventors: Hao Chen, Beijing (CN); Wenhua Yuan, Beijing (CN); Qian Zhao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 252 days.

(21) Appl. No.: 13/971,229

(22) Filed: Aug. 20, 2013

(65) Prior Publication Data
US 2014/0059459 A1    Feb. 27, 2014

(30) Foreign Application Priority Data
Aug. 21, 2012    (CN) .......................... 2012 1 0299562

(51) Int. Cl.
G06G 1/16     (2006.01)
G06F 3/0481   (2013.01)
G06F 1/16     (2006.01)

(52) U.S. Cl.
CPC .......... *G06F 3/04817* (2013.01); *G06F 1/162* (2013.01); *G06F 1/1677* (2013.01); *G06F 1/1616* (2013.01); *G06F 2200/1614* (2013.01)

(58) Field of Classification Search
CPC .... G06F 1/1622; G06F 3/0362; G06F 7/4818; G06F 2200/1614
(Continued)

(56) References Cited

U.S. PATENT DOCUMENTS 5,533,110 A * 7/1996 Pinard et al. ............ 379/355.01
6,567,101 B1   5/2003 Thomas
(Continued)

FOREIGN PATENT DOCUMENTS

CN    101645719 A    2/2010
CN    102246125 A    11/2011
(Continued)

OTHER PUBLICATIONS

First Chinese Office Action regarding Application No. 201210299562.1 dated Dec. 23, 2015. English translation provided by http://globaldossier.uspto.gov.
(Continued)

*Primary Examiner* — Rinna Yi
(74) *Attorney, Agent, or Firm* — Harness, Dickey & Pierce, P.L.C.

(57) ABSTRACT

A processing method and a processing device for displaying an icon and an electronic device are provided. The electronic device has a plurality of variable operation forms. Specifically, a current operation form of the electronic device is detected and determined. A first application applicable to the electronic device in the currently determined operation form is selected according to the determined operation form. Then, a display policy for the icon which corresponds to the selected and determined application and is displayed on the display screen of the electronic device is correspondingly adjusted. Therefore, it is ensured that the user can rapidly, conveniently and accurately select the available application in the case of the operation form of the electronic device, thus improving the user experience when the user uses the electronic device.

8 Claims, 4 Drawing Sheets

(58) Field of Classification Search
USPC .............. 715/810, 835, 764, 788, 800, 765
See application file for complete search history.

(56) References Cited

U.S. PATENT DOCUMENTS

| | | | |
|---|---|---|---|
| 6,700,773 B1 * | 3/2004 | Adriaansen | G06F 1/1618 345/156 |
| 7,353,457 B2 | 4/2008 | Scheu et al. | |
| 7,389,591 B2 * | 6/2008 | Jaiswal et al. | 33/366.11 |
| 7,796,872 B2 | 9/2010 | Sachs et al. | |
| 7,826,907 B2 * | 11/2010 | Kumar et al. | 700/28 |
| 7,827,502 B2 | 11/2010 | Scheu et al. | |
| 7,907,838 B2 | 3/2011 | Nasiri et al. | |
| 7,934,423 B2 | 5/2011 | Nasiri et al. | |
| 8,020,441 B2 | 9/2011 | Seeger | |
| 8,047,075 B2 | 11/2011 | Nasiri et al. | |
| 8,090,413 B2 | 1/2012 | Lin et al. | |
| 8,141,424 B2 | 3/2012 | Seeger et al. | |
| 8,250,921 B2 | 8/2012 | Nasiri et al. | |
| 8,351,773 B2 | 1/2013 | Nasiri et al. | |
| 8,462,109 B2 | 6/2013 | Nasiri et al. | |
| 8,464,180 B1 * | 6/2013 | Kirkham | H04M 1/72586 715/765 |
| 8,508,039 B1 | 8/2013 | Nasiri et al. | |
| 8,539,835 B2 | 9/2013 | Seeger et al. | |
| 8,952,832 B2 | 2/2015 | Nasiri et al. | |
| 8,960,002 B2 | 2/2015 | Nasiri et al. | |
| 8,997,564 B2 | 4/2015 | Nasiri et al. | |
| 2002/0167699 A1 * | 11/2002 | Verplaetse et al. | 359/158 |
| 2004/0100441 A1 * | 5/2004 | Rekimoto et al. | 345/158 |
| 2004/0268268 A1 | 12/2004 | Scheu et al. | |
| 2006/0187204 A1 | 8/2006 | Yi et al. | |
| 2008/0066013 A1 * | 3/2008 | Brodersen et al. | 715/836 |
| 2008/0126992 A1 | 5/2008 | Scheu et al. | |
| 2008/0148182 A1 * | 6/2008 | Chiang et al. | 715/810 |
| 2008/0166115 A1 | 7/2008 | Sachs et al. | |
| 2008/0235965 A1 | 10/2008 | Jaiswal et al. | |
| 2008/0314147 A1 | 12/2008 | Nasiri et al. | |
| 2009/0007661 A1 | 1/2009 | Nasiri et al. | |
| 2009/0145225 A1 | 6/2009 | Nasiri et al. | |
| 2009/0184849 A1 | 7/2009 | Nasiri et al. | |
| 2009/0193892 A1 | 8/2009 | Seeger | |
| 2009/0262074 A1 | 10/2009 | Nasiri et al. | |
| 2009/0265671 A1 | 10/2009 | Sachs et al. | |
| 2009/0298533 A1 * | 12/2009 | Alameh | G06F 1/1626 455/556.1 |
| 2009/0303204 A1 | 12/2009 | Nasiri et al. | |
| 2009/0303676 A1 * | 12/2009 | Behar | G06F 1/162 361/679.27 |
| 2010/0035659 A1 | 2/2010 | Lin et al. | |
| 2010/0064805 A1 | 3/2010 | Seeger et al. | |
| 2010/0071467 A1 | 3/2010 | Nasiri et al. | |
| 2010/0171712 A1 * | 7/2010 | Cieplinski | G06F 3/04883 345/173 |
| 2010/0214216 A1 | 8/2010 | Nasiri et al. | |
| 2011/0161875 A1 * | 6/2011 | Kankainen | 715/810 |
| 2011/0163955 A1 | 7/2011 | Nasiri et al. | |
| 2011/0197677 A1 | 8/2011 | Nasiri et al. | |
| 2012/0001722 A1 * | 1/2012 | Jaiswal et al. | 340/3.1 |
| 2012/0216612 A1 | 8/2012 | Seeger et al. | |
| 2012/0253738 A1 | 10/2012 | Nasiri et al. | |
| 2013/0120464 A1 * | 5/2013 | Wei et al. | 345/672 |
| 2013/0194313 A1 * | 8/2013 | Yang et al. | 345/676 |
| 2013/0265225 A1 | 10/2013 | Nasiri et al. | |
| 2014/0245160 A1 * | 8/2014 | Bauer et al. | 715/736 |
| 2015/0135831 A1 | 5/2015 | Nasiri et al. | |
| 2015/0192416 A1 | 7/2015 | Nasiri et al. | |
| 2015/0193006 A1 | 7/2015 | Nasiri et al. | |
| 2015/0234481 A1 | 8/2015 | Nasiri et al. | |

FOREIGN PATENT DOCUMENTS

| | | | |
|---|---|---|---|
| CN | 102508599 A | | 6/2012 |
| CN | 102508649 A | | 6/2012 |
| CN | 103677580 A | * | 3/2014 |
| JP | 2012058900 A | * | 3/2012 |

OTHER PUBLICATIONS

First German Office Action regarding Application No. 102013108965.8 dated Jan. 19, 2016. English translation provided by Unitalen Attorneys at Law.

* cited by examiner

PROCESSING METHOD AND PROCESSING DEVICE FOR DISPLAYING ICON AND ELECTRONIC DEVICE

This application claims the priority of Chinese Patent Application No. 201210299562.1, entitled "PROCESSING METHOD AND PROCESSING DEVICE FOR DISPLAYING ICON AND ELECTRONIC DEVICE", filed with the Chinese Patent Office on Aug. 21, 2012, which is incorporated by reference in its entirety herein.

FIELD OF THE INVENTION

The present invention relates to the technical field of electronic device manufacture and application, and particularly to a processing method and processing device for displaying an icon and an electronic device.

BACKGROUND OF THE INVENTION

With the continuous development of science and technology, a variety of electronic devices for enriching and facilitating people's life have been rapidly developed. The electronic device becomes indispensable in the people's life or work rapidly, due to its convenient and quick processing on various types of information and its various kinds of deformation.

Specifically, there are the variable forms of the electronic device, such as a PAD (a tablet computer) form and a notebook form. In accordance with different characteristics of various forms of the electronic device, for example, in accordance with different applications of the electronic device, the electronic device may be applied to different application scenarios. In other word, some applications may be only applicable to a certain form corresponding to a certain application scenario of the electronic device.

As known from the above, for the electronic device with multiple forms, there are requirements that different applications is applicable to different application scenarios in the prior art, according to the form of the electronic device and the application scenario corresponding to the form. However, in multiple applications, the display modes of the icons corresponding to the applications are the same in the case of different forms. Thus, when a user selects an application, the user may not accurately select the available application in the case of the form corresponding to the current application scenario. Accordingly, the user experience is degraded when the user uses the electronic device.

SUMMARY OF THE INVENTION

In view of this, the present invention provides a processing method and a processing device for displaying an icon and an electronic device are provided according to the invention to overcome the problem in the prior art. For example, the user may not accurately select an application applicable to a current operation form because the display modes of the icons corresponding to multiple applications are the same in the case of different operation forms, thus reducing the user experience.

To achieve the above-mentioned object, the following technical solution is provided according to the present invention.

A processing method for displaying an icon, the method being applied to an electronic device having multiple operation forms, includes:

detecting and determining the operation form of a current electronic device;

determining a first application applicable to the operation form according to the operation form; and adjusting a display policy for an icon of the first application.

Preferably, the plurality of operation forms includes at least a tablet computer form, or a notebook computer form, or a tent form.

Preferably, the adjusting a display policy for an icon of the first application includes:

ranking the icon of the first application; and displaying the ranked icon in a preset area of a display screen of the electronic device;

or separately displaying the ranked icon on a left, a right, an upside or a downside of the display screen of the electronic device.

Preferably, the adjusting a display policy for an icon of the first application includes:

adjusting a display size of the icon of the first application.

Preferably, the adjusting a display policy for an icon of the first application includes:

controlling the icon corresponding to the determined first application to flash at a preset frequency.

Preferably, the adjusting a display policy for an icon of the first application includes:

controlling the icon corresponding to the first application to be highlighted.

A processing device for displaying an icon, applied to an electronic device having multiple operation forms, includes:

a detecting unit adapted to detect and determine the operation form of a current electronic device;

a selecting unit adapted to determine, according to the operation form of the current electronic device detected by the detecting unit, a first application applicable to the operation form; and an adjusting unit adapted to adjust a display policy for an icon corresponding to the first application determined by the selecting unit.

Preferably, the adjusting unit includes:

a ranking module adapted to rank the icon of the first application; and a first display module adapted to display the ranked icon in a preset area of a display screen of the electronic device;

or a second display module adapted to separately display the ranked icon on a left, a right, an upside or a downside of the display screen of the electronic device.

Preferably, the adjusting unit includes:

a first adjusting module adapted to adjust a display size of the icon of the first application.

Preferably, the adjusting unit includes:

a first control module adapted to control the icon corresponding to the first application to flash at a preset frequency.

Preferably, the adjusting unit includes:

a second adjusting module adapted to control the icon corresponding to the first application to be highlighted.

An electronic device includes:

a display screen adapted to display an icon corresponding to a first application;

an adjusting component adapted to rotate and adjust the operation form of the electronic device; and the above-mentioned processing device for displaying an icon.

It is known from the above-mentioned technical solution that a processing method and a processing device for displaying an icon and an electronic device are provided according to the present invention, with comparison with the prior art. Specifically, the current operation form of the electronic device is detected and determined. The application in the electronic device applicable to the currently determined operation form is selected according to the determined operation form. Then, the icon which corresponds to the selected and determined application and is displayed on the display screen of the electronic device is correspondingly adjusted to be highlighted. In this way, it is ensured that the user can rapidly, conveniently and accurately select the available application in the case of the operation form of the electronic device, thus improving the user experience when the user operates the electronic device.

BRIEF DESCRIPTION OF THE DRAWINGS

The accompanying drawings needed to be used in the description of the embodiments or the prior art will be described briefly as follows, so that the technical solutions according to the embodiments of the present invention or according to the prior art will become more clearer. It is obvious that the accompanying drawings in the following description are only some embodiments of the present invention. For those skilled in the art, other accompanying drawings may be obtained according to these accompanying drawings without any creative work.

DETAILED DESCRIPTION OF THE INVENTION

The technical solution according to the embodiments of the present invention will be described clearly and completely as follows in association with the accompany drawings in the embodiments of the present invention. It is obvious that the described embodiments are only a part of the embodiments according to the present invention. All the other embodiments obtained by those skilled in the art based on the embodiments in the present invention without any creative work belong to the scope of the present invention.

A processing method and a processing device for displaying an icon and an electronic device are provided according to following embodiments of the present invention, and the specific structure is explained in details by the following embodiments.

First Embodiment

Figure 1:
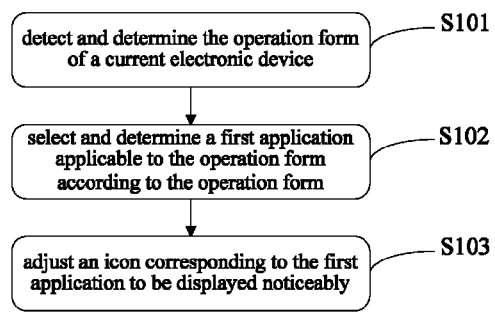
FIG. 1 is a flowchart of a processing method for displaying an icon according to a first embodiment of the present invention.

As shown in FIG. 1, FIG. 1 is a flowchart of a processing method for displaying an icon according to the present invention. The method is mainly applied to an icon C of the application on the display screen 1 of the electronic device, shown in FIG. 2. The electronic device provided in FIG. 2 may have multiple forms, for example, a tablet computer form as shown in FIG. 3a, a notebook form as shown in FIG. 3b and a tent form as shown in FIG. 3c. The electronic device shown in FIG. 2 to FIG. 3c mainly includes a first case A and a second case B, and a display screen 1 is provided on the first case A.

Figure 2:
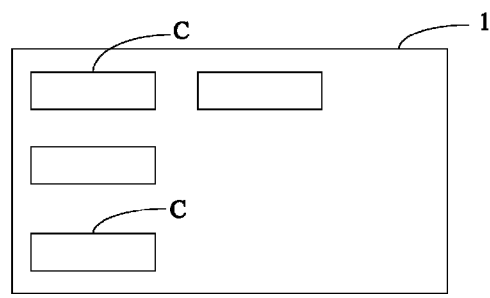
FIG. 2 is a structural schematic diagram of a display screen of an electronic device according to an embodiment of the present invention.
Figure 3A:
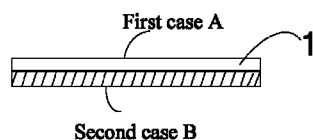
FIG. 3a is a structural schematic diagram of an electronic device in a tablet computer form according to an embodiment of the present invention.
Figure 3B:
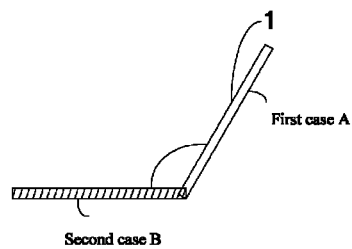
FIG. 3b is a structural schematic diagram of an electronic device in a notebook form computer according to an embodiment of the present invention.
Figure 3C:
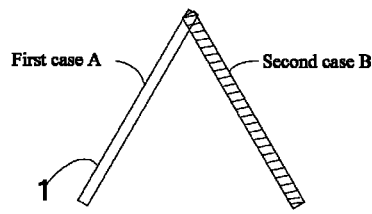
FIG. 3c is a structural schematic diagram of an electronic device in a tent form according to an embodiment of the present invention.

On the basis of the electronic device shown in FIG. 2 to FIG. 3c, the processing method for display an icon on the electronic device having multiple operation forms mainly includes steps S101-S103:

Step S101, detecting and determining the operation form of a current electronic device.

Step S102, selecting and determining a first application applicable to the operation form according to the operation form.

Step S103, adjusting a display policy for an icon corresponding to the first application.

In the above-mentioned step S101, the operation form of a current electronic device is detected and determined mainly by sensors provided in the electronic device. In the step S101, the operation form of the current electronic device is detected by the sensors which are respectively provided inside the corresponding cases of the electronic device. The detected data is compared with a preset data range corresponding to each operation form to determine the operation form of the current electronic device.

As shown in FIG. 3a to FIG. 3c, in the electronic device according to the present invention, the display screen and a processor are located on opposite sides, i.e., in the electronic device, the display screen is located in one case, and the processor is located in another case. The two cases form a complete case of the electronic device. As for the location of the above-mentioned sensors provided in the electronic device, a sensor is provided in the case in which the display screen is arranged, and a sensor is provided in the case in which the processor is arranged. The number of the above-mentioned provided sensors may be one or more as appropriate. The location of the sensor in respective case may be arbitrary. Preferably, the sensor is provided at a position on which the form variation may be detected sensitively. For example, the sensor may be provided inside the edges of the cases, or inside the closed edges of the two cases.

The sensor provided in the electronic device may either be a physical sensor or other sensors for measuring changes of a location and angle.

With the above-mentioned processing method for displaying an icon, in the electronic device having multiple operation forms, the icons corresponding to different applications may be displayed in the different modes in the case of the different operation forms. In this way, the requirement that different applications are applicable to different application scenarios is satisfied. The above-mentioned processing method for displaying an icon will be further described in detail as follows in conjunction with the different operation forms of the electronic device.

First, Step S101 is performed. Form data for the current electronic device is detected and acquired by the sensors. The form data may include relative location data and/or angle data. The acquired form data is compared with the preset data range corresponding to the respective operation form. When the detected form data falls into or is within the preset data range corresponding to one of the operation forms, the operation form of the current electronic device is determined.

Next, if it is determined in Step S102 that the electronic device is operated in the tablet computer form as shown in FIG. 3a, a first application applicable to the electronic device in the tablet computer form is selected and determined. The number of the first application is not limited to one, and the "first" herein is mainly used to distinguish from other applications not applicable to the same operation form.

Then, Step S103 is performed. The display policy for the icon which corresponds to the selected and determined first application and is displayed on the display screen of the electronic device is correspondingly adjusted. By adjusting the display policy, comparing with the icons corresponding to other applications, the icon corresponding to the first application may be displayed noticeably.

If it is determined in Step S102 that the electronic device is operated in the notebook computer form as shown in FIG. 3b, a first application applicable to the electronic device in the notebook computer form is selected and determined.

Then, Step S103 is performed. The display policy for the icon which corresponds to the determined first application and is displayed on the display screen of the electronic device is correspondingly adjusted. By adjusting the display policy, comparing with the icons corresponding to other applications, the icon corresponding to the first application may be displayed noticeably.

Similarly, if it is determined in Step S102 that the electronic device is operated in the tent form as shown in FIG. 3c, a first application applicable to the electronic device in the tent form is selected and determined.

Then, Step S103 is performed. The display policy for the icon which corresponds to the first application and is displayed on the display screen of the electronic device is correspondingly adjusted. By adjusting the display policy, comparing with the icons corresponding to other applications, the icon corresponding to the first application may be displayed noticeably.

It should be noted that the operation form of the electronic device not only includes the above-mentioned tablet computer form, the notebook computer form or the tent form, but also includes other forms, such as an erection form.

With the above-mentioned processing method for display an icon according to the present invention, the current operation form of the electronic device is detected, and the application which can be operated in the case of the operation form, i.e. the application applicable to the operation form, is selected according to the current operation form. Then, the icon which corresponds to the application and is displayed on the display screen of the electronic device is correspondingly adjusted to be displayed noticeably. Therefore, it is ensured that the user can rapidly, conveniently and accurately select the application available in the case of the operation form of the electronic device, thus improving the user experience when the user uses the electronic device.

Second Embodiment

Figure 4:
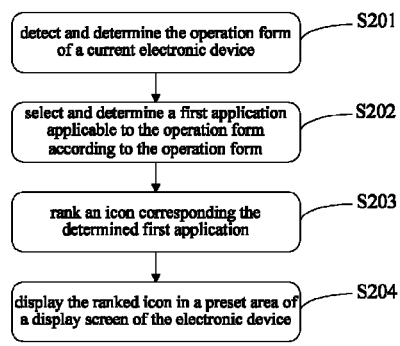
FIG. 4 is a flowchart of a processing method for displaying an icon according to a second embodiment of the present invention.

On the basis of the electronic device shown in FIG. 3a, FIG. 3b and FIG. 3c according to the above-mentioned first embodiment, FIG. 4 is a flowchart of a processing method for displaying an icon which is applied to the above-mentioned electronic device having multiple operation forms according to the embodiment of the present invention. The method mainly includes the following steps S201 to S204.

Step S201, detecting and determining an operation form of a current electronic device.

In the above-mentioned Step S201, the operation form of a current electronic device is mainly detected and determined by sensors provided in the electronic device. In Step S201, the operation form of the current electronic device is detected by the sensors which are respectively provided inside the corresponding cases of the electronic device. The detected data is compared with a preset data range corresponding to respective operation form to determine the operation form of the current electronic device.

In the second embodiment of the present invention, the location of the sensor in the electronic device and the detecting mode of the sensor are the same as those in the first embodiment, which may be referred to there and will not be repeated herein.

Step S202, selecting and determining the first application applicable to the operation form according to the operation form.

Step S203, ranking the icon corresponding to the determined first application.

In Step S203, the icon may be ranked according to the size, the number of click, or the selected random order of the first application. Further, the ranking mode of the present invention is not limited thereto.

Step S204, displaying the ranked icon in a preset area of a display screen of the electronic device.

In Step S204, the preset area may be any area on the display screen of the electronic device, and the area may be adjacent to the area on which other unadjusted icons are displayed. Alternately, the preset area may be independently displayed on the display screen.

Specifically, an independent or separate display mode is to separately display the ranked icon on a left, a right, an upside or a downside of the display screen of the electronic device.

In the processing method according to the above-mentioned second embodiment of the present invention, an initial display policy for the icon is changed. The processing method is applied to the electronic device having multiple variable operation forms by the following steps S201-S204.

Step S201 is performed. The form data for the current electronic device is detected and acquired by the sensors. The form data may include relative location data and/or angle data. The acquired form data is compared with the preset data range corresponding to the respective operation form. When the detected form data falls into or is within the preset data range corresponding to one of the operation forms, the operation form of the current electronic device is determined.

Next, if it is determined in Step S202 that the electronic device is operated in the tablet computer form as shown in FIG. 3a, the applications applicable to the electronic device in the tablet computer form are selected and determined. Specifically, the applications may be a certain game application, such as "Angry Birds" and "Link Go", or a certain application for search.

Then, Step S203 is performed. The icon which corresponds to the above-mentioned determined first application and is displayed on the screen of the electronic device is ranked.

Then, Step S204 is performed. The ranked icon is displayed in a preset area of a display screen of the electronic device.

By performing the ranking process of Step S203 and the display process of Step S204, it is actually achieved that the icon corresponding to the selected and determined first application is adjusted. Therefore, comparing with the icon corresponding to other application, the icon corresponding to the first application may be displayed noticeably.

Similarly, if it is determined in Step S202 that the electronic device is operated in the notebook computer form as shown in FIG. 3b, or that the electronic device is operated in the tent form as shown in FIG. 3c, the first applications in the case of the current operation form of the electronic device are selected and determined by the same way as above. Then, the subsequent processes, such as, the ranking process of Step S203 and the display process of Step S204, are performed. Therefore, comparing with the other icons, the adjusted icons are displayed noticeably.

With the above-mentioned processing method for displaying the icon according to the second embodiment of the present invention, in the electronic device having multiple operation forms, the icon corresponding to the different application may be ranked in the case of the different operation forms and then be displayed in the preset area. In this way, the icon corresponding to the selected application are displayed noticeably and distinguished. Thus, the requirement that different applications may be applicable to different application scenarios is satisfied. Therefore, the user can rapidly, conveniently and accurately select the available application in the case of the operation form of the electronic device, thus further improving the user experience when the user uses the electronic device.

Third Embodiment

Figure 5:
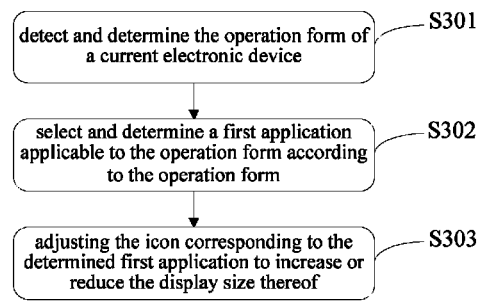
FIG. 5 is a flowchart of a processing method for displaying an icon according to a third embodiment of the present invention.

On the basis of the electronic device shown in FIG. 3a, FIG. 3b and FIG. 3c according to the above-mentioned first embodiment, FIG. 5 is a flowchart of a processing method for displaying an icon which is applied to the above-mentioned electronic device having multiple operation forms according to the embodiment of the present invention. The method mainly includes the following steps S301 to S303.

Step S301, detecting and determining an operation form of a current electronic device.

Step S302, selecting and determining a first application applicable to the operation form according to the operation form.

Step S303, adjusting the icon corresponding to the determined first application to increase the display size thereof, or adjusting the icon corresponding to the determined first application to reduce the display size thereof.

The above-mentioned Steps S301-Step S302 are the same as the steps S201-S202 in the first and second embodiments, which may be referred to there and will not be repeated herein.

In Step S303, the display size of the icon of the first application is adjusted, i.e., an initial display policy for the icon is changed. Specifically, the display size is increased or reduced. The reference icon herein is typically referred to other unselected or unadjusted icon. That is to say, the display size of the icon is increased or reduced with respect to the reference icon.

It should be noted that, the third embodiment of the present invention may be performed in conjunction with the processing method according to the above-mentioned second embodiment. In this case, the adjustment process further includes the following steps.

After the determined icon is ranked and displayed, the display size of the icon may further be increased or reduced.

Alternatively, after the display size of the determined icon is increased or reduced, the determined icon is ranked and displayed.

The processing method for displaying an icon according to the third embodiment of the present invention may be applied in the electronic device having multiple variable operation forms by the steps S301-S303.

Step S301 is performed. Form data for the current electronic device is detected and acquired by the sensor. The acquired form data is compared with the preset data range corresponding to the respective operation form. When the detected form data falls into or is within the preset data range corresponding to one of the operation forms, the operation form of the current electronic device is determined.

Next, if it is determined in Step S302 that the electronic device is operated in the notebook computer form as shown in FIG. 3b, the first application applicable to the notebook computer form in the electronic device is selected and determined. Specifically, the first application may be a certain application for communication, such as "QQ" and "MSN", or a certain application for document processing.

Then, Step S303 is performed. The display size of the icon corresponding to the determined first application is increased or reduced under the control.

Alternatively, before Step S303, the icon which corresponds to the determined first application and is displayed on the display screen of the electronic device is ranked. Then the ranked icon is displayed in a preset area on the display screen of the electronic device, or is separately displayed on an upside, a downside, a left or a right of the display screen.

Alternatively, after Step S303, the icon whose display size has been adjusted is ranked. Then, the icon is displayed in the preset area, or is separately displayed on an upside, a downside, a left or a right of the display screen.

Similarly, if it is determined in Step S302 that the electronic device is operated in the tablet computer form as shown in FIG. 3a, or that the electronic device is operated in the tent form as shown in FIG. 3c, the first application in the case of the current operation form of the electronic device is selected and determined by the same way as above. Then the subsequent Step S303 is performed. The display size of the icon corresponding to the determined first application is adjusted, and then the steps of ranking and displaying the icon in the preset area in the second embodiment are performed. Therefore, comparing with the icons corresponding to other applications which is not selected and determined, the icon corresponding to the first application may be displayed noticeably.

With the above-mentioned processing method for display an icon according to the third embodiment of the present invention, in the electronic device having multiple operation forms, the icon corresponding to the different application may be adjusted to increase or reduce the display size of the determined icon in the case of different operation forms. In this way, the icon corresponding to the selected application is displayed noticeably and distinguished. Further in conjunction with the method in the second embodiment, the requirement that different applications may be applicable to different application scenarios is satisfied, and the user can rapidly, conveniently and accurately select the available application in the case of the operation form of the electronic device, thus further improving the user experience when the user uses the electronic device.

Fourth Embodiment

Figure 6:
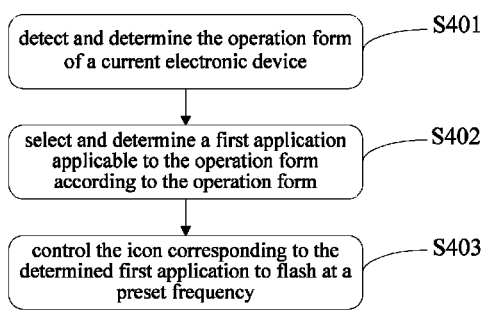
FIG. 6 is a flowchart of a processing method for displaying an icon according to a fourth embodiment of the present invention.

On the basis of the electronic device shown in FIG. 3a, FIG. 3b and FIG. 3c according to the above-mentioned first embodiment, FIG. 6 is a flowchart of a processing method for displaying an icon which is applied to the above-mentioned electronic device having multiple operation forms according to the embodiment of the present invention. The method mainly includes the following steps S401-S403.

Step S401, detecting and determining an operation form of a current electronic device.

Step S402, selecting and determining a first application applicable to the operation form according to the operation form.

Step S403, controlling the icon corresponding to the determined first application to flash at a preset frequency.

The above-mentioned Steps S401~Step S402 are the same as those in the first, second and third embodiments, which may be referred to there and will not be repeated herein.

In Step S403, the flashing at a preset frequency refers to a display policy, in which the display mode of the selected icon is to flash at the preset frequency, with respect to an unselected or unadjusted icon.

It should be noted that, the fourth embodiment of the present invention may be performed in conjunction with the processing method according to the above-mentioned second and third embodiments. In this case, in the steps of adjusting the icon and controlling the icon to flash, multiple combinations are included.

In a first combination, after the determined icon is ranked and displayed, the determined icon may further flash at a preset frequency.

In a second combination, after the determined icon is ranked and displayed, the display size of the determined icon is increased or reduced, and then the determined icon may flash at the preset frequency.

In a third combination, after the display size of the determined icon is adjusted to be increased or reduced, the determined icon may flash at the preset frequency.

The order of the steps of adjusting the icon and controlling the icon to flash in the first, second and third combinations may be changed arbitrarily, which is not limited thereto in the present invention.

The processing method for display an icon according to the fourth embodiment of the present invention may be applied in the electronic device having multiple variable operation forms. The method may include the steps S401-S403.

Step S401 is performed. Form data for the current electronic device is detected and acquired by the sensor. The acquired form data is compared with the preset data range corresponding to the respective operation form. When the detected form data falls into or is within the preset data range corresponding to one of the operation forms, the operation form of the current electronic device is determined.

Next, if it is determined in Step S402 that the electronic device is operated in the tent form as shown in FIG. 3c, a first application applicable to the electronic device in the tent form is selected and determined. Specifically, the first application may be a certain application for video player, for example.

Then, Step S403 is performed. The icon corresponding to the determined first application is controlled to flash at a preset frequency.

Alternatively, the steps of the adjustment according to the above-mentioned first, second and third combinations are used to the display policy for the determined icon.

Similarly, if it is determined in Step S402 that the electronic device is operated in the tablet computer form as shown in FIG. 3a, or that the electronic device is operated in the tent form as shown in FIG. 3b, the first application in the case of the current operation form of the electronic device is selected and determined by the same way as above. Then, the subsequent Step S403 is performed. The icon corresponding to the determined first application is controlled to flash at the preset frequency. Further in conjunction with the methods according to the second and third embodiments, comparing with the icons corresponding to other applications which is not selected and determined, the icon corresponding to the first application may be displayed noticeably.

It should be noted that, in addition to the above-mentioned way in which the display policy for the icon corresponding to the determined first application is changed, in the step of the adjustment, the icon corresponding to the first application may also be highlighted under the control, or other display policy may be adopted, so long as the first application may be distinguished and displayed noticeably in the case of the operation form of the electronic device. The present invention is not limited to the above-mentioned display policies.

With the above-mentioned processing method for displaying an icon according to the fourth embodiment of the present invention, in the electronic device having multiple operation forms, the icons corresponding to different applications in the case of different operation forms may be controlled to flash the determined icons at the preset frequency. In this way, the icon corresponding to the selected application is displayed noticeably and distinguished. Further, in conjunction with the methods in the second and the third embodiments, when the requirement that different applications may be applied to different application scenarios is satisfied, the user can rapidly, conveniently and accurately select the available application in the case of the operation form of the electronic device, thus further improving the user experience when the user uses the electronic device.

The above-mentioned processing method for displaying an icon according to the present invention may be implemented by various apparatuses. Therefore, a processing device for displaying an icon is provided based on the above embodiments of the methods. The specific structure of the processing device will be described as follows.

Fifth Embodiment

Figure 7:
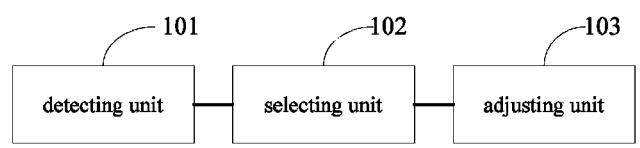
FIG. 7 is a structural schematic diagram of a processing device for display an icon according to a fifth embodiment of the present invention.

As shown in FIG. 7, FIG. 7 is a structural schematic diagram of a processing device for displaying an icon according to the invention. The device is mainly applied to an electronic device having multiple operation forms, which may include a detecting unit 101, a selecting unit 102 and an adjusting unit 103.

The detecting unit 101 is adapted to detect and determine the operation form of a current electronic device.

The selecting unit 102 is adapted to determine, according to the operation form of the current electronic device detected by the detecting unit, a first application applicable to the operation form.

The adjusting unit 103 is adapted to adjust a display policy for an icon corresponding to the first application determined by the selecting unit.

The implementation and the principle of each unit in the device correspond to those described in the method according to the first embodiment, which can be referred to here and will not be repeated herein.

Figure 8:
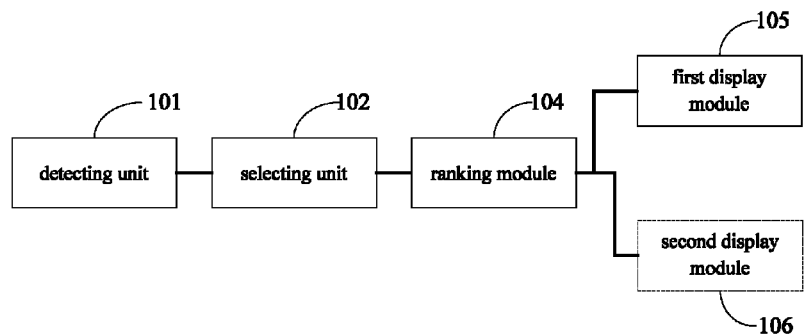
FIG. 8 is a structural schematic diagram of another processing device for displaying an icon according to the fifth embodiment of the present invention.

Furthermore, another processing device for displaying an icon is also provided according to the present invention. As shown in FIG. 8, the device may include a detecting unit 101, a selecting unit 102, a ranking module 104 and a first display module 105 or a second display module 106 (shown by a dotted-line block in FIG. 8).

Specifically, a combination of the ranking module 104 with the first display module 105 or with the second display module 106 may substitute for the adjusting unit 103 in FIG. 7.

The detecting unit 101 is adapted to detect and determine the operation form of a current electronic device.

The selecting unit 102 is adapted to select and determine, according to the operation form of the current electronic device detected by the detecting unit, a first application applicable to the operation form.

The ranking module 104 is adapted to rank the icon of the determined first application.

The first display module 105 is adapted to display the ranked icon in a preset area of a display screen of the electronic device.

Alternatively, the second display module 106 is adapted to separately display the ranked icon on a left, a right, an upside or a downside of the display screen of the electronic device.

The implementation and the principle of each unit in the device correspond to those described in the method according to the second embodiment, which can be referred to here and will not be repeated herein.

Figure 9:
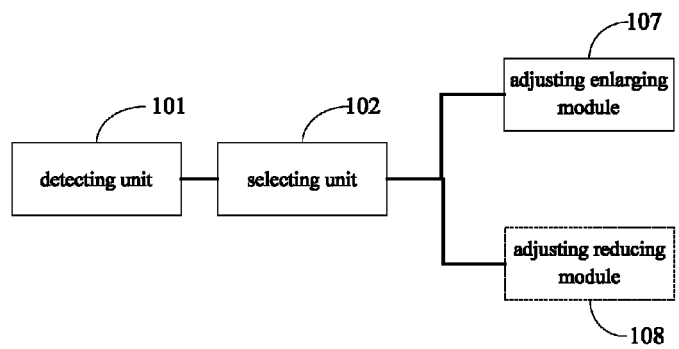
FIG. 9 is a structural schematic diagram of yet another processing device for displaying an icon according to the fifth embodiment of the present invention.

Furthermore, another processing device for displaying an icon is also provided according to the present invention. As shown in FIG. 9, the device may include a detecting unit 101, a selecting unit 102 and a first adjusting module. The first adjusting module may include an adjusting enlarging module 107 or an adjusting reducing module 108 (shown by a dotted-line block in FIG. 9).

Specifically, the first adjusting module, i.e., the adjusting enlarging module 107 or the adjusting reducing module 108 may substitute for the adjusting unit 103 in FIG. 7.

The detecting unit 101 is adapted to detect and determine the operation form of a current electronic device.

The selecting unit 102 is adapted to select and determine, according to the operation form of the current electronic device detected by the detecting unit, a first application applicable to the operation form.

The first adjusting module is mainly adapted to adjust the display size of the icon of the first application.

Specifically, the adjusting enlarging module 107 is adapted to adjust and increase the display size of the icon corresponding to the determined first application.

The adjusting reducing module 108 is adapted to adjust and reduce the display size of the icon corresponding to the determined first application.

The implementation and the principle of each unit in the device correspond to those described in the method according to the third embodiment, which can be referred to here and will not be repeated herein.

Figure 10:
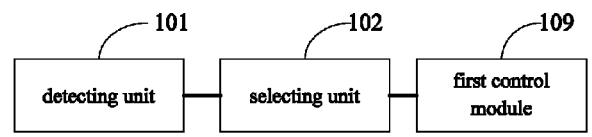
FIG. 10 is a structural schematic diagram of still another processing device for displaying an icon according to the fifth embodiment of the present invention.

Furthermore, yet another processing device for displaying an icon is also provided according to the invention. As shown in FIG. 10, the device may include a detecting unit 101, a selecting unit 102 and a first control module 109.

Specifically, the first control module 109 may substitute for the adjusting unit 103 in FIG. 7.

The detecting unit 101 is adapted to detect and determine the operation form of a current electronic device.

The selecting unit 102 is adapted to select and determine, according to the operation form of the current electronic device detected by the detecting unit, a first application applicable to the operation form.

The first control module 109 is adapted to control the icon corresponding to the determined first application to flash at a preset frequency.

The implementation and the principle of each unit in the device correspond to those described in the method according to the fourth embodiment, which can be referred to here and will not be repeated herein.

It should be noted that, the units or modules in the above-mentioned processing devices for displaying an icon may be arbitrarily combined. In particular, the units or the modules for adjusting the form or location of the icon may be arbitrarily combined. Furthermore, the detecting unit in the device may be a sensor in the electronic device.

The above-mentioned processing device for displaying the icon according to the present invention may be applied to the electronic device having multiple operation forms. In this case, the current operation form of the electronic device is detected, and the first application which can be used in the case of the operation form, i.e. the first application applicable to the operation form, is selected according to the current operation form. Then, the icon which corresponds to the first application and is displayed on the display screen of the electronic device is correspondingly adjusted to be displayed noticeably. Therefore, it is ensured that the user can rapidly, conveniently and accurately select the available first application in the case of the operation form of the electronic device, thus improving the user experience when the user uses the electronic device.

It should be noted that, in addition to the above-mentioned way in which the display policy for the icon corresponding to the determined first application is changed, in step of the adjustment, the adjusting module 103 may also be a second adjusting module (not shown in the figure) adapted to control the icon corresponding to the first application to be highlighted. In additional, the adjusting unit 103 may also adopt display policies in which the icon is adjusted in other ways, so long as the first application may be distinguished and displayed noticeably in the case of the operation form of the electronic device. The present invention is not limited to the above-mentioned display policies.

The processing method and the processing apparatus for displaying an icon according to the present invention are applied to the electronic device having multiple operation forms. Therefore, an electronic device is provided according to the invention correspondingly. The specific structure of the electronic devices is shown as FIG. 10, which may include: a display screen 1, an adjusting component 2 and a processing device for displaying an icon (not shown in the figure).

The display screen 1 is adapted to display the icon corresponding to the application. The adjusting component 2 is adapted to rotate and adjust the operation form of the electronic device. The structure of the processing device for displaying an icon corresponds to any of the processing devices for displaying an icon according to the fifth embodiment, and the implementation thereof corresponds to the methods according to the first embodiment to the third embodiment.

Specifically, the application of the electronic device will be described in detail by way of the following examples.

When the electronic device is a personal computer, the operation form thereof may be a tablet computer form, a notebook computer form, a tent form and an erection form. An icon corresponding to "Angry Birds" which can be only operated in the case of the tablet computer form and other document icon are displayed on the display screen of the computer.

The operation form of the current electronic device is detected by the processing method and device for displaying an icon and the electronic device mentioned above. If the detected current operation form is operated in the tablet computer form, the first application applicable to the tablet computer form, i.e. the "Angry Birds" game program, is selected. The icon which is displayed on the display screen and corresponds to "Angry Birds" is adjusted. In particular, the icon may be separately displayed on an upside, a downside, a left or a right of the display screen; and/or the display size of the icon is adjusted to be increased or reduced; and/or the icon is controlled to flash at a preset frequency. However, other document icon remains in an initial state.

When the above-mentioned method is applied in the electronic device having multiple operation forms, it may be achieved that the icons corresponding to the different applications may be displayed noticeably in the case of the different operation forms, i.e., may be displayed noticeably in the case of the operation form to which the application is applicable. When the requirement that different applications may be applicable to different application scenarios is satisfied, the user can rapidly, conveniently and accurately select the application available in the case of the operation form of the electronic device, thus further improving the user experience when the user uses the electronic device.

Those described above are only embodiments of the present invention. It should be noted that, for the skilled in the art, improvements and modifications may also be made without departing from the principle of the invention. Those improvements and modifications should also be included in the scope of protection of the present invention.

The invention claimed is:

1. A method for displaying an icon, the method being applied to an electronic device having a plurality of variable operation forms, wherein a plurality of applications are applied to the electronic device, the electronic device comprises a first case and a second case being movable relative to the first case, and a form variation of the plurality of variable operation forms is associated with a movement of the second case relative to the first case, and the plurality of variable operation forms comprises at least a tablet computer form, a notebook computer form, and a tent form, and the plurality of variable operation forms corresponds to the respective applications, the method comprising:

in response to the detecting of the form variation of the electronic device among the plurality of variable operation forms comprising at least the tablet computer form, the notebook computer form, and the tent form, determining a current operation form of the electronic device using sensors for measuring changes of a location and an angle of the electronic device;

in response to the determination of the current operation form of the electronic device, determining a first application applicable to the electronic device in the determined current operation form from the plurality of applications not applicable to the determined current operation form;

adjusting a display policy for an icon of the determined first application applicable to the determined current operation form;

wherein the adjusting the display policy for the icon of the first application comprises:

ranking the icon of the first application according to a size of the icon, a number of clicks on the icon, or a selected random order of the first application; and displaying the ranked icon of the first application in a preset area of a display screen of the electronic device; and when the preset area is independently displayed on the display screen of the electronic device, separately displaying the ranked icon of the first application on a left, a right, an upside or a downside of the display screen of the electronic device.

2. The method according to claim 1, wherein the adjusting the display policy for the icon of the first application comprises:

adjusting a display size of the icon of the first application.

3. The method according to claim 1, wherein the adjusting the display policy for the icon of the first application comprises:

controlling the icon corresponding to the determined first application to flash at a preset frequency.

4. The method according to claim 1, wherein the adjusting the display policy for the icon of the first application comprises:

controlling the icon corresponding to the first application to be highlighted.

5. An electronic device having a plurality of variable operation forms, comprising:

a first case and a second case being movable relative to the first case, wherein a plurality of applications are applied to the electronic device, a form variation of the plurality of variable operation forms of the electronic device is associated with a movement of the second case relative to the first case, and the plurality of variable operation forms comprises at least a tablet computer form, a notebook computer form, and a tent form and the plurality of variable operation forms corresponds to the respective applications;

a display screen adapted to display icons corresponding to the plurality of applications;

an adjusting component adapted to rotate and adjust the plurality of variable operation forms of the electronic device for the form variation; and a processor and memory storing instructions, wherein the processor executes the instructions to:

detect the form variation of the electronic device among the plurality of variable operation forms comprising at least the tablet computer form, the notebook computer form, and the tent form, and determine, in response to the form variation of the electronic device, a current operation form of the electronic device using sensors for measuring changes of a location and an angle of the electronic device;

determine, in response to the determination of the current operation form of the electronic device, a first application applicable to the current operation form from the plurality of applications not applicable to the determined current operation form;

adjust a display policy for an icon corresponding to the determined first application applicable to the determined current operation form;

for adjusting the display policy for the icon of the first application comprises, wherein the processor further executes the instructions to:

rank the icon of the first application according to a size of the icon, a number of clicks on the icon, or a selected random order of the first application; and display the ranked icon of the first application in a preset area of a display screen of the electronic device; and when the preset area is independently displayed on the display screen of the electronic device, separately display the ranked icon of the first application on a left, a right, an upside or a downside of the display screen of the electronic device.

6. The electronic device according to claim 5, wherein the processor executes the instructions to adjust a display size of the icon of the first application.

7. The electronic device according to claim 5, wherein the processor executes the instructions to control the icon corresponding to the first application to flash at a preset frequency.

8. The electronic device according to claim 5, wherein the processor executes the instructions to control the icon corresponding to the first application to be highlighted.

* * * * *